(12) United States Patent
Rodriguez-Parada et al.

(10) Patent No.: US 7,229,222 B2
(45) Date of Patent: Jun. 12, 2007

(54) PACKAGE SEALING MEANS AND PHOTONIC DEVICE PACKAGES SO FORMED

(75) Inventors: Jose Manuel Rodriguez-Parada, Hockessin, DE (US); Maria Petrucci-Samija, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/190,155

(22) Filed: Jul. 26, 2005

(65) Prior Publication Data

US 2006/0029338 A1    Feb. 9, 2006

Related U.S. Application Data

(60) Provisional application No. 60/599,009, filed on Aug. 5, 2004.

(51) Int. Cl.
*G02B 6/36* (2006.01)
(52) U.S. Cl. .......................................... 385/94; 385/89
(58) Field of Classification Search ................ 385/92, 385/94
See application file for complete search history.

(56) References Cited

U.S. PATENT DOCUMENTS

| | | | |
|---|---|---|---|
| 5,163,327 A | 11/1992 | Papai et al. | |
| 5,568,581 A | 10/1996 | Johnson et al. | |
| 2002/0161114 A1* | 10/2002 | Gunatillake et al. | 525/100 |
| 2003/0044128 A1 | 3/2003 | Crane et al. | |
| 2005/0220418 A1* | 10/2005 | Demissy et al. | 385/55 |

FOREIGN PATENT DOCUMENTS

| | | |
|---|---|---|
| EP | 0 381 370 A | 8/1990 |
| EP | 0 395 839 A | 11/1990 |
| WO | WO 99/05553 A | 2/1999 |
| WO | WO 99/39021 | 8/1999 |

OTHER PUBLICATIONS

Robert W. Filias: Metallization of Silica Optical Fibers, Materials Research Society Symp. Proc., 1998, pp. 263-272, vol. 531.
Farrel et al., The Liquid Crystal Packaging Solution, Proceedings of the 2003 International Symposium on Microelectronics, pp. 18-23.

* cited by examiner

*Primary Examiner*—Tina M. Wong

(57) ABSTRACT

The present invention is directed to hermetically sealed photonic device packages and the polymeric sealing means employed therefore for connecting one or more optical fibers to a photonic device.

11 Claims, 2 Drawing Sheets

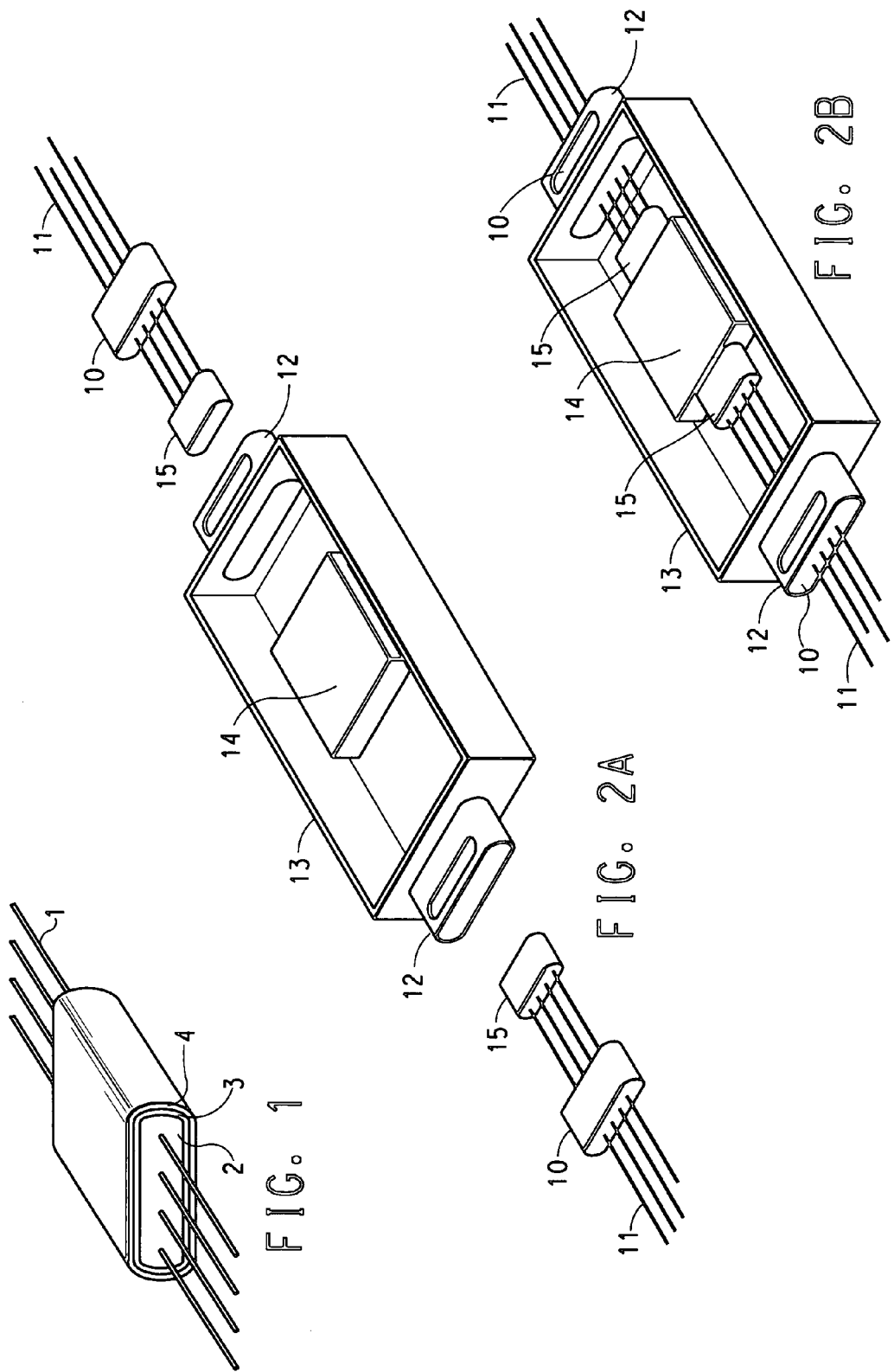

– 1 –

PACKAGE SEALING MEANS AND PHOTONIC DEVICE PACKAGES SO FORMED

FIELD OF THE INVENTION

The present invention is directed to hermetically sealed photonic device packages and the polymeric sealing means employed therefore.

TECHNICAL BACKGROUND OF THE INVENTION

The term "photonic" has been coined in the art of optical communications by analogy to the term "electronic." A "photonic" device is one which processes an optical frequency communications signal. Although the signal processing elements in a photonic device are optical in nature, and many do not require any form of electronic signal processing, most photonic devices in common use incorporate various types of electrical or electronic connections, whether it be a heater, a photo detector, or other electrical or electronic devices.

The electrical contacts employed in photonic devices are subject to corrosion when exposed in use to moisture and oxygen, greatly reducing the lifetime of such devices. There is considerable premium associated with the exclusion of moisture and oxygen from photonic packages. This is particularly problematical because many such devices need to be coupled to fiber optic inputs and outputs. In a typical application in the art, an optical fiber array is sealed into a ferrule that is then inserted into a receptacle in the housing of the photonic device package; the connection so formed then being sealed to provide a hermetic seal. It is important in this application that the permeability of the ferrule material itself be of low permeability to oxygen and moisture. Typical photonic device packages are welded or soldered metal boxes, although they may be low permeability plastic.

In common practice is the use of an all metallic sealing means. For example, metal-coated optical fibers are soldered to a metallic ferrule, which is in turn inserted into a receptacle mounted upon, or integral to the housing of the photonic device, and the connection is then soldered to provide a hermetic seal.

See, for example, Filias; Materials Research Society Symp. Proc. Vol. 531, 1998, p. 263-272.

It is further known to prepare ferrules from injection molded polymers having ceramic inserts, as described in U.S. Pat. No. 5,568,581. However, there remains a need for inexpensive directly moldable plastic ferrules which offer high processibility combined with excellent barrier properties and low coefficient of thermal expansion (CTE).

One such material, which has been suggested in the art, is a liquid crystal polymer (LCP). LCPs are known to offer excellent molding performance, very high barrier to moisture and oxygen, low CTE and good thermal performance.

Farrell et al., "The Liquid Crystal Packaging Solution," Proceedings of the 2003 International Symposium on Microelectronics, pp. 18-23, discloses the use of metal plated LCP lids suitable for solder sealing to an LCP printed circuit board having molded-in wire interconnects. Also disclosed therein is an example of two optical fibers passing through the sidewall of an LCP package.

Metallization of LCP is known. Beitinger et al., WO99/39021, disclose sputter coating, ion-plating, and electroplating of LCP to achieve a metallized surface thereof.

SUMMARY OF THE INVENTION

The present invention provides for a sealing means for connecting one or more optical fibers to a photonic device, said means comprising
   a shaped article comprising at least 80% of one or more liquid crystal polymers;
   one or more optical fibers disposed to pass through said shaped article, said optical fibers being molded into place within said shaped article;
   said shaped article being of a shape to permit coupling with its complementary counterpart on the housing of a photonic device.

The present invention further provides for a hermetically sealed optical signal processor comprising
   a photonic device having a housing provided with a first sealing means;
   one or more optical fibers optically coupled to said photonic device, and a second sealing means comprising
      a shaped article comprising at least 80% of one or more liquid crystal polymers; and,
      one or more optical fibers disposed to pass through said shaped article, said optical fibers being molded into place within said shaped article;
   wherein said first and second sealing means are complementary counterparts to one another and said first and second sealing means are hermetically sealed to one another.

BRIEF DESCRIPTION OF THE DRAWINGS

FIG. 1 shows an enlarged schematic of one embodiment of the sealing means of the invention in the form of a metal-coated LCP ferrule.

FIG. 2a is a schematic drawing indicating how the ferrule of the invention mates with a complementary counterpart on a metal coated or metallic photonic device housing.

FIG. 2b is a schematic drawing showing the connection completed to form an optical signal processor.

FIG. 4b is a side view of the molding fixture employed in the Example showing an optical fiber passing through.

DETAILED DESCRIPTION

Figure 3:
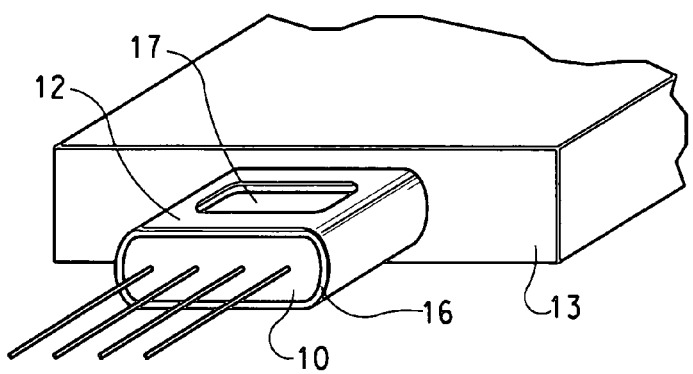
FIG. 3 is an enlarged view of the connection, indicating the solder seal which provides the hermeticity.

The present invention provides for a sealing means for connecting one or more optical fibers to a photonic device, said means comprising
   a shaped article comprising at least 80% of one or more liquid crystal polymers;
   one or more optical fibers disposed to pass through said shaped article, said optical fibers being molded into place within said shaped article;
   said shaped article being of a shape to permit coupling with its complementary counterpart on the housing of a photonic device.

The sealing means hereof is designed to provide easy connectability and hermetic sealing between optical signal carrying cables and a photonic device.

For the purpose of the present invention, the term "sealing means" shall be understood to refer to any shaped article employed according to the methods herein described to achieve hermetic sealing between one or more input or output optical fiber and a photonic device to which said fiber is to be optically coupled.

The term "complementary counterpart" refers to a shaped article which is adapted to mate with another shaped article in order to effect a sealable connection. As used herein it is taken primarily to refer to that portion of the housing of a photonic device which is adapted to mate with the sealing means of the invention, and which, after mating and sealing provides the hermetically sealed optical signal processing device of the invention. The operability of the present invention is not contingent upon there being a separate and distinguishable housing for the photonic device. Any type of photonic device package, which is provided with a complementary counterpart to the sealing means of the invention hereof, would serve equally well.

In one embodiment, the sealing means hereof and the complementary counterpart on the housing of the photonic device to which it is to be coupled are both fabricated from the same or closely similar liquid crystalline polymers so that after coupling, hermetic sealing can be achieved by thermal or laser welding.

In another embodiment, the sealing means further comprises a metallic coating deposited upon the surface thereof when said complementary counterpart is made of metal or is metal coated so that after coupling hermetic sealing may be achieved by soldering or welding.

Any sealing means, such as is known in the art, may be employed according to the present invention without prejudice with regard to the operability hereof. In one embodiment, the sealing means is a ferrule, as shown in FIG. 1. The subsequent description herein will refer specifically to a ferrule, but the practitioner hereof shall understand that any arbitrarily shaped article is suitable so long as the sealing means is shaped to mate with a complementary counterpart in the housing of the photonic device to which coupling is to be effected.

Several aspects of the present invention are highly advantageous over the current practice in the art. Use of liquid crystal polymers provides direct moldability of optical fibers into a ferrule with no required intermediate steps such as fiber metallization or metal bonding as is required when metal ferrules are employed. Further, fabrication of the metal ferrule must proceed in a separate step from fiber insertion whereas in the present invention, fibers are directly molded into the ferrule in a single step. Finally, in an all LCP coupling, hermeticity may be achieved simply by spot-melting the thermoplastic polymer.

For the purpose of the present invention, the term LCP shall be understood to encompass melt anisotropic polymers which are characterized by the formation of oriented domains in the molten state and which under shear exhibit alignment of those domains to give a high degree of order in the liquid phase. Upon cooling solid parts with anisotropic physical properties can be obtained. Suitable LCPs include co-polymers of flexible segments with mesogenic monomers that contain benzene/naphthalene rings or trans cyclohexane moieties. Useful LCPs include polyesters, poly(ester-imides), poly(ester-amides), poly(ester-amide-imides), polyazomethines, or mixtures thereof. Preferred are polyesters or poly(ester-amides), especially if they are partially or fully aromatic. Aromatic groups include phenylene, naphthylene, biphenylene, and others. The aromatic groups may have alkyl substituents.

Preferred LCPs include condensation polyesters based on aromatic monomers such as hydroxyacids including but not limited to p-hydroxybenzoic acid and 2-hydroxy-6-naphtoic acid, diols including but not limited to hydroquinone, 4,4'-biphenol, and substituted hydroquinones, and diacids including but not limited to terephtalic acid, isophtalic acid, and 2,6-naphthalene-dicarboxilic acids. More preferred are copolymers consisting essentially of 100 parts by mole of a diol, 100 parts by mole of diacid, and 150-320 parts by mole of a hydroxyacid wherein the —OH to —COOH ratio=1. Most preferred are polymers wherein the diol moiety consists essentially of 100 molar parts of hydroquinone and bisphenol at a mole ratio of 50-100:50-0, the diacid moiety consists essentially of 100 molar parts of terephthalic acid and 2,6 naphthalene dicarboxylic acid at a mole ratio of 70-30:30-70, and the hydroxyacid consists essentially of 150-320 molar parts of hydroxybenzoic acid.

Suitable LCPs include, but are not limited to, commercial LCP brands including Zenite® from DuPont, Vectra® from Ticona, and Xydar® from Amoco.

Also suitable for the practice of the present invention are LCPs compounded with glass fibers and inorganic fillers such as talc and metal particles. One of skill in the art will appreciate that the specific selection of an LCP for the purposes of the present invention will depend upon the particulars of the specific application. Some LCPs and composites thereof may exhibit superior barrier properties against oxygen and moisture while others may provide improved CTE.

An LCP suitable for the invention may also include minor amounts of other polymers as well as various adjuvants such as antioxidants, UV-blockers, flame-retardants and other such which are commonly employed in the plastics industry for imparting certain desired attributes to polymer products. However, suitable LCPs for the present invention will comprise at least 80% by weight of LCP.

One embodiment of the present invention is illustrated schematically in FIG. 1. A silica optical fiber array, 1, is molded in place in a shaped LCP sealing means, 2, which is designed to mate to a complementary counterpart in the housing of a photonic device to which the fibers are to be coupled. Silica optical fibers are typically ca. 125 µm in diameter. In common commercial practice fiber arrays of 4, 8, 16, 32 and 40 fibers are employed. In the embodiment shown in FIG. 1 there is a so-called tie layer, 3, 1-10 nm thick, preferably 5 nm thick. Preferably the tie layer consists essentially of metallic Ti, Ni, or Cr, or a mixture thereof. In the embodiment represented in FIG. 1, disposed upon the tie layer is a further metallic coating, 4, ca. 10-100 nm in thickness, preferably ca. 45 nm in thickness, preferably consisting essentially of Au or Pt. The embodiment of FIG. 1 is, by virtue of the metallic coating, suitable for coupling to a metallic complimentary counterpart, wherewith hermetic sealing can be achieved by welding or soldering of the two metal surfaces.

The practitioner hereof shall understand that the complementary counterpart to the ferrule hereof may be a non-metal, such as a ceramic having a metal coating, a metal, a polymeric material having a metal coating, or a polymeric material without a metal coating suitable for coupling to a ferrule which does not have a metal coating.

FIG. 2a illustrates the several components, which make up the hermetically sealed optical signal processor of the invention. Shown are two sets of complementary coupling parts, the ferrule of the invention, 10, having optical fibers, 11, molded there within, and the complementary counterpart, 12, mounted upon the housing, 13, containing a photonic device, 14. Also shown is the optical fiber end block, 15, which is to be connected to the photonic device within the housing.

FIG. 2b illustrates the completed coupling or connection, the parts being the same as in FIG. 2a.

FIG. 3 shows an expanded view of the sealed connection of FIG. 2b, which results in the hermetically sealed optical signal processor of the invention. The ferrule, 10, is mated to its complementary counterpart, 12, and hermetically sealed thereto by way of a seal, 16, prepared after coupling is effected. The seal, 16, may be a solder strip combining two metal surfaces, it may be welded metal surfaces, and it may be a thermally welded strip formed at the interface of two thermoplastic LCP parts. FIG. 3 specifically shows an embodiment suitable for a metallic seal, where an aperture, 17, at the top of the complimentary counterpart, 12, on the housing, 13, may be employed to introduce molten solder to effect sealing.

The LCP ferrule of the invention is fabricated by molding of the thermotropic LCP resin by the same melt forming processes typically used for thermoplastics. Suitable melt forming processes include compression molding, and injection molding. In the present invention an optical fiber or fiber array is placed inside the mold before the polymer is introduced, held in place by a support structure. In injection molding, the mold cavity is then filled with molten polymer, in compression molding, solid polymer is introduced in powder or pellet form, the mold closed and heated to effect melting. After cooling the mold, the desired part containing the fiber encapsulated by the polymer is obtained. LCP melts readily wet the silica optical fibers producing parts in which good adhesion of the polymer to the glass surface guaranties a good seal. LCPs also exhibit very low melt viscosities when compared with typical thermoplastic polymers and therefore readily fill molds with intricate patterns without damaging the fibers.

Typically LCPs are injection molded at temperatures 10 to 50° C. above their melting points, while the mold temperatures are kept considerably lower. Most commercial aromatic polyester LCPs can be processed at melt temperatures between 250 and 390° C. and mold temperatures between 30 and 150° C.

The same processing conditions can be used for compression molding. In compression molding, the optical fiber or fiber array can be placed inside the mold along with the appropriate charge of polymer to be used making sure that the disposition of the fibers is not disturbed by the solid polymer. The mold is then placed in a press and heated to a temperature above its melting point. After the polymer is molten a slight pressure is applied to uniformly distribute the molten polymer.

Metallization of the LCP ferrule may be accomplished by any convenient means such as is known in the art. However, sputter coating is preferred. In sputtering, a metal is vaporized by bombardment with energetic ions in an inert atmosphere such as argon at low pressures. As described in Beitinger et al., op.cit., a sputter-coated palladium layer adheres well to LCP. It is found in the invention herein that better adhesion for gold and platinum are obtained when the LCP is first sputter coated with a tie layer of Ti, Ni, or Cr.

Prior to sputter coating, the LCP surface needs to be cleaned of organic contaminants. This may be accomplished by treatment with aqueous cleaning agents or treatment with organic solvent, either treatment being followed by water washing. Aqueous cleaning with ultrasonic energy is preferred. Drying after washing is preferred.

The surface of the LCP should be roughened, preferably by plasma etching, which may be accomplished in the vacuum chamber prior to sputtering. The actual sputtering conditions are dependent upon the specific metal used, the atmosphere, and the particular set up.

The maximum temperature of the substrate LCP should be at least 50° C. below the melting point of the LCP. The temperature depends upon the power used in sputtering the metal.

The ferrule so prepared is in form suitable for mating to a complementary counterpart on the housing of a photonic device, as shown in FIGS. 2a and 2b. In the embodiment therein illustrated, the optical fibers are terminated in a connector or "end block" which is passed through the housing, and glued into the photonic device itself, while the ferrule hereof is inserted into the complementary counterpart thereof to form a hermetic seal, as illustrated in FIG. 3. In the embodiment shown in FIG. 3, solder is introduced through a hole in the complimentary counterpart after insertion of the metalized ferrule, all the metallic surfaces being at a temperature which induces solder flow. Alternative means for achieving sealing include resistance welding.

In an alternative embodiment, the housing of the photonic device is itself fabricated from an LCP or other polymer, which is compatible with the LCP of the ferrule hereof. In this embodiment, no metallization is required. The hermetic sealing can be achieved by causing localized melting of the mated LCP surfaces. This may beneficially be achieved by use of laser heating, but other methods may also be employed such as use of commonly available adhesives such as epoxies.

The present invention further provides for a hermetically sealed optical signal processor comprising
a photonic device having a housing provided with a first sealing means;
one or more optical fibers optically coupled to said photonic device, and a second sealing means comprising
a shaped article comprising at least 80% of one or more liquid crystal polymers; and,
said optical fibers disposed to pass through said shaped article, said optical fibers being molded into place within said shaped article;
wherein said first and second sealing means are complementary counterparts to one another and said first and second sealing means are hermetically sealed to one another.

The photonic device suitable for use in the invention is any such device as is well known in the art and may comprise any such well known optical communications components such as, but not limited to, arrayed waveguide gratings, Bragg gratings, couplers, circulators, wavelength division multiplexers and demultiplexers, Y-branch thermo-optic switches, switch arrays, and other devices such as are known in the art. Components such as those are assembled in various configurations in a photonic device to perform one or more specific signal processing functions The fundamental building block of all such components is the optical waveguide, which may be of silica or organic polymer. The term "optical waveguide" is a term of art referring to an optical frequency signal conduction structure, which is fabricated upon a substrate, and typically of rectangular or trapezoidal cross-section.

According to the present invention, the photonic device is contained within a housing. The photonic device may be integrated into a single piece housing and device, such as might be done in a plastics molding operation when the housing is an LCP. Alternatively, the housing may be a sealed metal box containing the photonic device. The metal box in combination with the optical fiber input and/or output via the fiber optic end block, and the ferrule of the invention when introduced into the complementary counterpart thereof on the housing, combine to make the hermetically sealed optical signal processor of the invention.

EXAMPLES

Example 1

Zenite® 2000 pellets (E.I. du Pont de Nemours and Co., Wilmington, Del.) were dried for about 18 hours at 130° C. in a vacuum over were put into an aluminum fixture 0.125 inch (0.32 cm) thick with a square reservoir 0.75×0.75 in (1.90×1.90 cm) formed in its center. The fixture containing the polymer was heated to 250° C. at 10°/min in a Pasadena Hydraulics Press. Upon reaching 250° C., 10,000 psi (68.9 MPa) pressure was applied for 1 minute. After cooling to room temperature the sample was removed from the fixture and set aside. The sample plaque was 0.125 in (0.32 cm) thick.

A film of Zenite® 2000 was also prepared by pressing polymer pellets between aluminum plates at 250° C. at 10000 psi pressure. A 5×5 in (12.7×12.7 cm) sheet about 0.01 in (0.254 mm) thick was obtained.

An optical fiber-encapsulation fixture was made from an aluminum plate, 6×6 in and 0.1875 in thick. The fixture was provided with a 0.75×0.75 in square reservoir in its center, with a channel 0.090 inches deep machined across the fixture through its center, bisecting the plate. This channel allowed the optical fiber to be precisely positioned near the centerline of the thickness of the fixture.

Figure 4A:
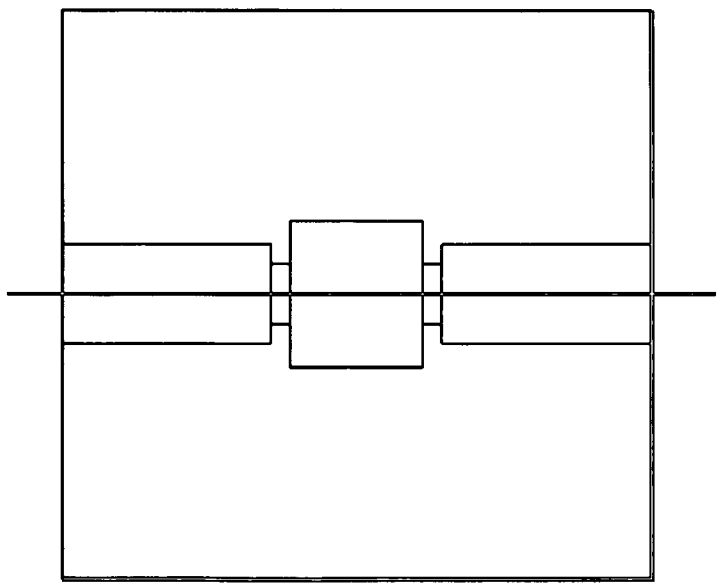
FIG. 4a is a top view of the molding fixture employed in the Example.
Figure 4B:

FIG. 4a is a top view of the optical fiber encapsulation fixture, not drawn to scale. The heavy line through the plate represents the placement of the optical fiber. The channel bisecting the fixture is 0.125 in wide, necking down to 0.06 in wide near the center section. FIG. 4b shows a side view of the encapsulating fixture, 0.1875 in thick, with the optical fiber in place.

Two 40-inch lengths of polymer-clad single mode optical fiber, 1310 and 1550 nm wavelength, were cut. The optical fiber was obtained from Corning, Inc., Corning, N.Y. One 40-inch length was set aside as a reference.

The Zenite® plaque prepared previously was hand pressed into the encapsulating fixture. The fixture was heated in the Pasadena Press to 250° C. at 10°/min without the optical fiber in place. After reaching temperature, 10,000 psi pressure was applied for about 3 minutes. The fixture was cooled to ~60° C. and removed from the press. A groove was cut across the Zenite® block within the dimensions of the 0.09 inch deep channel. This channel and groove facilitated the placement of the 40-inch long optical fiber test specimen.

About 16 inches from one end of the optical fiber test specimen, a 2½ in length of the fiber's polymer cladding was stripped. The so-stripped section of the fiber was placed through the center of the fixture. The encapsulation of the optical fiber was carried out in a sequence of four pressings, each at 250° C. and 10000 psi applied force. Each time a 0.75×0.75 in piece of the 0.01 in thick film prepared above was added to the mold. Flow of polymer was observed through the thin channel and into the wide section of the channel encapsulating the fiber.

The light transmission characteristics of the encapsulated fiber were measured at 974.2 nm and 1532.5 nm. The ends of both optical fibers were cleaved and end fire coupled from single mode laser sources. After measuring the transmission of the reference fiber at 974.2 nm, the transmission of light through the encapsulated fiber was measured at both 974.2 nm and 1532.5 nm. The transmission of the reference fiber was then measured at 1532.5 nm. This protocol was utilized so the input and output coupled fibers would not be disturbed when the laser sources were switched. At both 974.2 nm and 1532.5 nm, throughput (calculated as $P_{out}/P_{in}$) of the test specimen was at least 90% of that of the reference fiber, as shown by the data in Table 1

TABLE 1

| | Optical power transmission of encapsulated optical fiber vs. reference | | | |
|---|---|---|---|---|
| Laser Current | Wavelength | P(out) Reference | P(out) Encapsulated | Throughput (%) |
| 75 mA | 974.2 nm | 17.2 mW | 15.6 mW | 91% |
| 30 mA | 1532.5 | 1.74 mW | 1.94 mW | 90% |

The invention claimed is:

1. A sealing means for connecting one or more optical fibers to a photonic device, said means comprising
    a shaped article comprising at least 80% of one or more liquid crystalline polymers; said shaped article having an outer surface;
    one or more optical fibers disposed to pass through said shaped article, said optical fibers being molded into place within said shaped article;
said shaped article being of a shape to permit coupling with its complementary counterpart on the housing of a photonic device wherein said liquid crystalline polymers consists essentially of a diol moiety, a diacid moiety, and a hydroxy-acid moiety wherein the diol moiety consists essentially of 100 molar parts of hydroquinone and bisphenol at a mole ratio of 50-100:50-0, the diacid moiety consists essentially of 100 molar parts of terephthalic acid and 2,6 naphthalene dicarboxylic acid at a mole ratio of 70-30:30-70, and the hydroxyacid consists essentially of 150-320 molar parts of hydroxybenzoic acid.

2. A hermetically sealed optical signal processor comprising
    a photonic device having a housing provided with a first sealing means;
    one or more optical fibers optically coupled to said photonic device, and a second sealing means comprising
    a shaped article comprising at least 80% of one or more liquid crystalline polymers; and,
    said optical fibers disposed to pass through said shaped article, said optical fibers being molded into place within said shaped article;
wherein said first and second sealing means are complementary counterparts to one another and said first and second sealing means are hermetically sealed to one another.

3. The hermetically sealed optical signal processor of claim 2 wherein said photonic device further comprises an optical waveguide disposed upon a substrate.

4. The hermetically sealed optical signal processor of claim 3 wherein said photonic device further comprises one or more optical signal processing components selected from the group consisting of arrayed waveguide gratings, Bragg gratings, couplers, circulators, wavelength division multiplexers and demultiplexers, Y-branch thermo-optic switches, and switch arrays.

5. The hermetically sealed optical signal processor of claim 3 wherein said optical waveguide comprises silica.

6. The hermetically sealed optical signal processor of claim 3 wherein said optical waveguide comprises organic polymer.

7. The hermetically sealed optical signal processor of claim 2 wherein said hermetic seal comprises metal.

8. The hermetically sealed optical signal processor of claim 2 wherein said hermetic seal comprises organic adhesive.

9. The hermetically sealed optical signal processor of claim 2 wherein said hermetic seal comprises liquid crystalline polymer.

10. The hermetically sealed optical signal processor of claim 7 wherein said metal comprises gold or platinum.

11. The hermetically sealed optical signal processor of claim 2 wherein said liquid crystalline polymer consists essentially of a diol moiety, a diacid moiety, and a hydroxyacid moiety wherein the diol moiety consists essentially of 100 molar parts of hydroquinone and bisphenol at a mole ratio of 50-100:50-0, the diacid moiety consists essentially of 100 molar parts of terephthalic acid and 2,6 naphthalene dicarboxylic acid at a mole ratio of 70-30:30-70, and the hydroxyacid consists essentially of 150-320 molar parts of hydroxybenzoic acid.

* * * * *